United States Patent [19]

Kirjavainen et al.

[11] 4,304,537
[45] Dec. 8, 1981

[54] EXTRUDER HEAD FOR REGULATING A PROCESS OF APPLYING A FOAMED PLASTIC INSULATION TO TELEPHONE WIRES

[76] Inventors: Kari Kirjavainen, Kristianinkatu 7 C 38, 00170 Helsinki 17; Matti Sistola, Leenankuja 2 K 114, 02230 Espoo 23, both of Finland

[21] Appl. No.: 148,373

[22] Filed: May 9, 1980

[30] Foreign Application Priority Data

May 11, 1979 [FI] Finland .................................. 791513

[51] Int. Cl.³ .......................... B29F 3/02; B29F 3/10; B29D 27/00
[52] U.S. Cl. ....................................: ............ 425/113; 264/25; 264/45.9; 264/174; 366/81; 366/145; 366/146; 425/209; 425/817 C
[58] Field of Search ................. 366/146, 144, 81, 145; 264/45.9, 26, 25, 174; 425/113, 144, 209, 817 C

[56] References Cited

U.S. PATENT DOCUMENTS

| | | | |
|---|---|---|---|
| 2,573,440 | 10/1951 | Henning | 425/113 X |
| 2,583,329 | 1/1952 | Eckert | 264/26 X |
| 2,750,627 | 6/1956 | Gray | 264/45.9 X |
| 2,752,633 | 7/1956 | Weitzel | 425/113 X |
| 2,848,739 | 8/1958 | Henning | 264/45.9 X |
| 3,114,171 | 12/1963 | Colombo | 366/144 X |
| 3,129,459 | 4/1964 | Kullgren et al. | 264/25 X |
| 3,253,300 | 5/1966 | Gove et al. | 366/144 X |
| 3,422,493 | 1/1969 | Heston | 264/25 X |
| 4,181,647 | 1/1980 | Beach | 264/45.9 |

FOREIGN PATENT DOCUMENTS

| | | | |
|---|---|---|---|
| 547795 | 5/1956 | Belgium | 366/146 |
| 2559344 | 7/1976 | Fed. Rep. of Germany . | |
| 1181031 | 2/1970 | United Kingdom | 264/25 |

OTHER PUBLICATIONS

"Wire and Cable Coaters' Handbook". First Edition, Wilmington, Delaware, E. I. Dupont de Nemours and Co., Inc., ©1968, pp. 18-19.

*Primary Examiner*—Philip Anderson
*Attorney, Agent, or Firm*—Finnegan, Henderson, Farabow, Garrett & Dunner

[57] ABSTRACT

The invention concerns an extruder head for regulating the temperature of a flow of molten plastic containing a foaming agent. In the flow passage of the extruder head is arranged a mixer which is inductively heated and transfers heat to the plastic flow thereby regulating the temperature thereof during the passage through the extruder head.

2 Claims, 1 Drawing Figure

U.S. Patent
Dec. 8, 1981
4,304,537
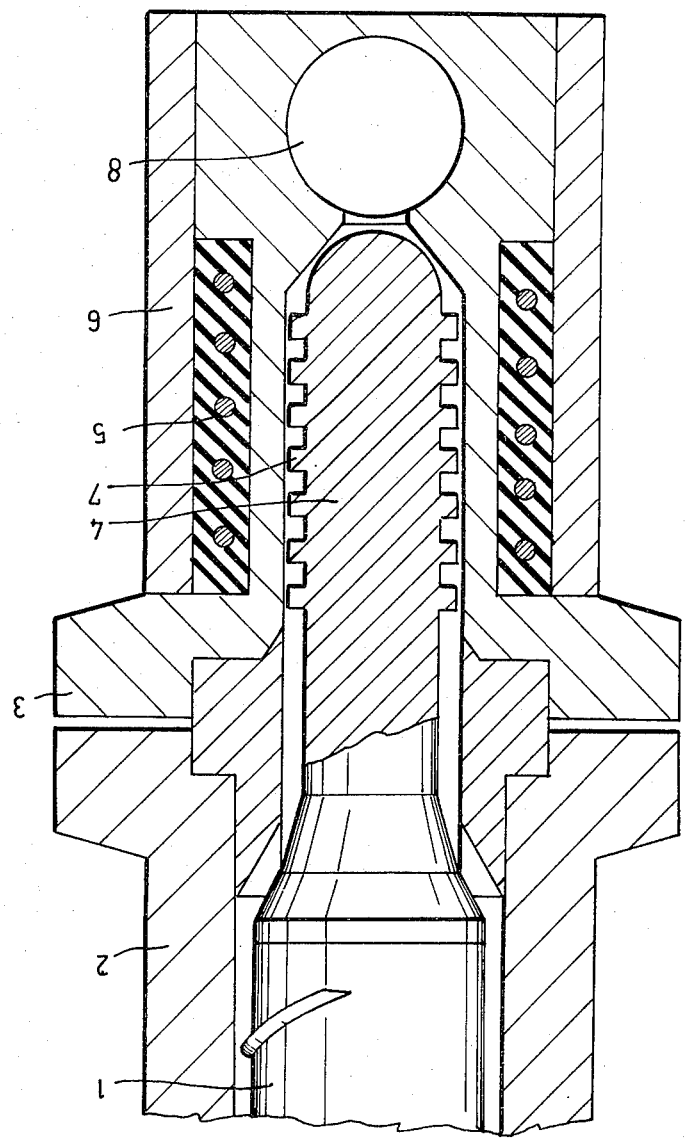

EXTRUDER HEAD FOR REGULATING A PROCESS OF APPLYING A FOAMED PLASTIC INSULATION TO TELEPHONE WIRES

The present invention relates to a process for applying a foamed plastic insulation to telephone wires. In the process a telephone wire is unwound from a starting reel, is then drawn thinner and/or heated, coated with a foam plastic insulation, cooled, dried and finally wound on storage reel.

The most important property of the final product is a correct capacitance which mainly depends on a correct diameter. The diameter of the insulation is to a great extent determined by the foaming degree of the foaming agent which again varies greatly with changes of temperature.

Thus an important regulating parameter is always the temperature of the plastic mass. In a conventionally heated extruder head the temperature of the mass can hardly be influenced since the plastic flows quickly past the head; during the time available only a slight amount of heat convects from the heated wall of the extruder to the surface of the plastic flow. It has been suggested to regulate the temperature of the plastic mass by means of the last zone of the plastic extruder, before the extruder head. The drawback of this method is a long delay before plastic mass having the desired new temperature enters the extruder tool.

The drawback of this method is thus a very slow regulation which is emphasized every time the production is started. During the starting stage of the line usually about 15 kilometers of useless telephone wire is produced before the diameter and the capacitance of the wire have reached the desired values.

It is the object of the present invention to provide a new extruder head in order to overcome said disadvantage.

The extruder head comprises a winding for inductive heating arranged in its wall and is characterized in that in the flow channel of the extruder head is centrally provided a metal body to be heated by said inductive heating means, said metal body being fixed to the transport screw of the extruder and having at its surface protruding means for mixing the plastic mass flow and for enlargening the contact surface between said metal body and the plastic mass for more effective transfer of heat therebetween. The extruder head works, with respect to its electrical properties, as a transformer having an iron core of bad quality. When current is switched on in the winding, turbulent currents are generated in the centrally arranged body heating the same quickly.

Tests proved that the extruder head according to the invention enables a very quick regulation of the temperature of the plastic mass and thus of the whole process. It is possible to change the temperature of the plastic mass in the extruder head at a rate of about 0.25° C./second and at the beginning of production the scrap wire is reduced to only about one kilometer, instead of about 15 kilometers received in previous methods.

In the following the invention will be described with reference to the accompanying drawing which shows a section of an extruder head according to the invention.

In the drawing reference numeral 1 designates a transport screw of a conventional extruder where a flow of molten plastic mass is extruded along the annular channel between the screw 1 and a surrounding cylindrical wall 2. The extruder head 3 is attached in a known manner to the extruder end and comprises means for injecting a foaming agent into the plastic flow, said injecting means likewise being fully conventional and therefore not shown in the drawing.

In the channel for the plastic mass flow through the extruder head is centrally arranged a metal body 4 fixed to and rotating with the transport screw 1, e.g. in one piece therewith. In the wall of the extruder head 3 surrounding the channel containing the metal body 4 is provided a winding 5 for inductive heating of the metal body 4 by turbulent currents generated therein by the winding 5. The effect of the winding 5 is amplified by the flux bridges 6 surrounding the winding on the outside. The metal body 4 has at its surface protruding formations 7, partly to ensure a thorough intermixing of the plastic mass and the foaming agent, partly to enlargen the contact surface between the heated body 4 and the plastic mass for more effective heat transfer therebetween. The protrusions 7 may be formed as one or several continuous screw-threads but may also be of a more irregular configuration.

From the extruder head the flow of molten plastic containing a foaming agent enters an extruder tool or die for applying the coating of foam plastic on a wire drawn therethrough. The extruder tool or die may be of a conventional kind and it is therefore considered unnecessary to show the tool or die in the drawing; only the tool or die fitting passage of the extruder bead is designated with reference number 8.

What we claim is:

1. In an extruder head defining a channel between an extruder and an extrusion passage for forming foam plastic insulation for application to wire including inductive heating means for regulating the temperature of plastic mass flow in said channel, an improvement comprising means for distributing heat uniformly in said plastic mass flow to permit rapid change and control of the temperature of said plastic mass flow, said heat distributing means comprising an elongated metal body coaxially disposed in said channel and heated by said inductive heating means, and a plurality of ribs integrally formed on and protruding from the surface of said metal body for increasing the surface contact area between said metal body and said plastic mass flow, said metal body being coaxially fixed to a transport screw of said extruder.

2. The extruder head as in claim 1 wherein said ribs are interconnected to form at least one continuous screw thread.

* * * * *